United States Patent
Delius

(10) Patent No.: US 9,585,406 B2
(45) Date of Patent: Mar. 7, 2017

(54) UNCOOKED DRY OR SEMI-DRY SAUSAGE PRODUCT HAVING A CASING MADE OF A TEXTILE SHEET

(75) Inventor: Ulrich Delius, Frankfurt (DE)

(73) Assignee: Kalle GmbH, Wiesbaden (DE)

( * ) Notice: Subject to any disclaimer, the term of this patent is extended or adjusted under 35 U.S.C. 154(b) by 642 days.

(21) Appl. No.: 12/356,615

(22) Filed: Jan. 21, 2009

(65) Prior Publication Data

US 2009/0191315 A1    Jul. 30, 2009

(30) Foreign Application Priority Data

Jan. 24, 2008   (DE) ................ 10 2008 006 876

(51) Int. Cl.
*A22C 13/00*   (2006.01)

(52) U.S. Cl.
CPC ...... *A22C 13/00* (2013.01); *A22C 2013/0069* (2013.01); *A22C 2013/0093* (2013.01)

(58) Field of Classification Search
CPC ............ A22C 13/00; A22C 2013/0093; A22C 2013/0069
See application file for complete search history.

(56) References Cited

U.S. PATENT DOCUMENTS

| | | | | |
|---|---|---|---|---|
| 4,322,575 A * | 3/1982 | Skipper | ............. | 174/120 SR |
| 4,396,039 A * | 8/1983 | Klenk et al. | ............. | 138/118.1 |
| 4,401,135 A * | 8/1983 | Andra et al. | ............. | 138/118.1 |
| 4,525,418 A * | 6/1985 | Dinklage et al. | ............. | 442/123 |
| 4,546,023 A | 10/1985 | Kastl et al. | | |
| 4,623,566 A | 11/1986 | Kastl et al. | | |
| 5,147,930 A * | 9/1992 | La Fleur et al. | ............. | 525/57 |
| 5,328,755 A * | 7/1994 | Mills et al. | ............. | 428/215 |
| 6,143,212 A * | 11/2000 | Tseng | ............. | 264/12 |
| 2003/0138743 A1* | 7/2003 | Burtin | ............. | 430/401 |
| 2004/0047951 A1* | 3/2004 | Johansson | ............. | 426/105 |
| 2004/0062834 A1* | 4/2004 | Cruz | ............. | 426/5 |
| 2004/0146610 A1* | 7/2004 | Lee | ............. | A22C 13/0013 426/99 |
| 2005/0106294 A1* | 5/2005 | Stalberg et al. | ............. | 426/135 |
| 2005/0244601 A1 | 11/2005 | Grund et al. | | |
| 2006/0234611 A1* | 10/2006 | Delius et al. | ............. | 452/32 |
| 2007/0031620 A1* | 2/2007 | Auf Der Heide et al. | ............. | 428/34.8 |
| 2007/0178785 A1* | 8/2007 | Collins | ............. | 442/101 |
| 2008/0280021 A1* | 11/2008 | Hammer et al. | ............. | 426/652 |
| 2009/0029012 A1* | 1/2009 | Foegler et al. | ............. | 426/105 |

FOREIGN PATENT DOCUMENTS

| | | |
|---|---|---|
| DE | 1 411 489 A1 | 4/1969 |
| DE | 21 28 613 A1 | 12/1972 |
| DE | 2128613 A1 * | 12/1972 |
| DE | 23 30 774 A1 | 9/1974 |
| DE | 30 29 028 A1 | 2/1982 |
| DE | 41 41 924 A1 | 6/1993 |
| DE | 42 37 138 A1 | 3/1994 |
| DE | 44 17 244 A1 | 11/1994 |
| DE | 31 47 519 A1 | 5/2006 |
| EP | 0 105 558 B1 | 4/1984 |
| WO | WO 0075220 A1 * | 12/2000 |
| WO | WO 2007059911 A1 * | 5/2007 |

OTHER PUBLICATIONS

Papkov, Analysis of the evolution of production of hydrated cellulose textile fibres, Fibre Chemistry. vol. 28. No. 3., p. 148-150 (1996).*
SWIFCO, 2007 http://web.archive.org/web/20070322172116/http://www.swicofil.com/products/278polymethylmethacrylate.html.*
"About.com: German Food" Mar. 12, 2008 http://web.archive.org/web/20080312072932/http://germanfood.about.com/od/regionalspecialties/tp/12Germansausages.htm.*
Martienssen, W & Warlimont H. "Springer Handbook of Condensed Matter and Materials Data." Springer 2005 p. 511.*
Chanda, Manas & Roy, Salil, "Plastics Technology Handbood." 4th Edition, CRC Press 2006 p. 4-45 to 4-46.*
J. Brandrup et al., Polymer Handbook, 4th Edition (1999) John Wiley & Sons, Inc. 543-571.

* cited by examiner

*Primary Examiner* — Viren Thakur
(74) *Attorney, Agent, or Firm* — ProPat, L.L.C.

(57) ABSTRACT

The invention relates to uncooked dry or semi-dry sausage products in tubular casings that are based on an optionally-coated textile material. The tubular casing has a longitudinal seam with a sealing strip. On the sealing strip is located a discontinuous layer of a sealing polymer. The sealing strip is bonded to the casing essentially at sealing points defined by the discontinuous layer. The invention further relates to a process for producing the uncooked dry or semi-dry sausage product.

24 Claims, No Drawings

UNCOOKED DRY OR SEMI-DRY SAUSAGE PRODUCT HAVING A CASING MADE OF A TEXTILE SHEET

CROSS-REFERENCE TO RELATED APPLICATIONS

This application claims priority to German Patent Application 10 2008 006 876.4 filed Jan. 24, 2008 which is hereby incorporated herein by reference in its entirety.

FIELD OF THE INVENTION

The invention relates to an uncooked dry or semi-dry sausage having a casing based on a textile sheet, wherein the casing has a thermally formed seam joined in the longitudinal direction.

BACKGROUND OF THE INVENTION

Uncooked dry or semi-dry sausages are known to consumers under names such as salami, Mettwurst and Cervelatwurst. Generally, these are products in which the meat, after the stuffing process, has passed through fermentation with a great loss of moisture. Use is made of coarsely minced pork, beef, bacon and also curing salt and spices. After the mixture has been stuffed into suitable casings which are permeable to water vapor, the sausages are first subjected to what is termed reddening by warming. The temperatures can be highly variable ("sweating" at 18-25° C., "pasteurizing" at 60-70° C.). Subsequently, cold smoking generally proceeds, followed by ripening for several weeks in specially climatically controlled chambers (max. 23° C.). In the course of this the sausages lose between 25 and 45% of their original water content. Under the casing, owing to the action of smoke and drying, a dark-colored, sliceable surface forms. Uniform color and consistence of the surface are very important for consumer acceptability.

For unimpeded process of ripening and, as a result thereof, a uniform surface development, the sausage casing used must have high and uniform permeability to water vapor and smoke aromas. Traditionally, usually, use is made of casings made of collagen or fiber-reinforced regenerated cellulose. These casings are manufactured by industry directly in tubular form, and therefore do not have seams or other join zones and exhibit constant properties over the entire periphery.

Occasionally, use is made also made of casings having a seam joint running in the longitudinal direction. For producing sausages having a special non-cylindrical form, casings are even produced in which two fabric layers are sewed to one another at the periphery. In this manner, sausages having curved contours, e.g. pear shapes, may be made. An advantage of these casings, is the use of conventional readily joinable flat materials. For the uncooked dry or semi-dry sausage application, in this case, use is made of special fibrous flat materials, in particular woven fabrics, knitted fabrics and nonwovens, generally in coated form. Such casings are described, for example, in DE-A 21 28 613; DE 23 30 774; DE 30 29 028; DE 31 47 519 (whose United States equivalent is U.S. Pat. No. 4,525,418); DE 41 41 924; DE 42 37 138 or DE 44 17 244.

Despite all these efforts of industry, textile-based uncooked dry or semi-dry sausage casings have achieved only limited importance in the market.

However, for economic reasons, there is in addition fundamental interest in casings based on flat materials. Casings manufactured without a seam, for example those made of collagen or regenerated celluloses, are relatively expensive in manufacture. Their production proceeds with the aid of special annular dies from which a previously produced dispersion or solution of the casing material, e.g. a collagen dispersion or viscose, is extruded, and in this case is shaped to form tubular casings. The films must subsequently be passed through various chemical baths, as a result of which the material is solidified by coagulation or chemical regeneration. These processes scarcely permit rationalization of production by enlargement of the plants. High production amounts may only be achieved by parallel operation of a plurality of dies and a plurality of tube-conducting appliances. Webs of flat material, in contrast, may be produced very efficiently by producing a base material in a large web width and as required, cutting it into a multiplicity of narrower webs (what are termed blanks). A further advantage is that, starting from a standard web material, various blank widths and therefore various calibers can be achieved in a short time. This is very desirable, in particular, for the production of sausage casings, since the calibers thereof are scarcely standardized.

A further economic aspect which argues for the use of flat materials in the production of the casings relates to the stuffing operation at the sausage manufacturer's. Tubular casings cannot, in principle, be stuffed continuously. The most efficient stuffing process for tubular casings is the operation using filling and clipping machines. In this case the casings must be processed before use into what are termed shirred sticks. The length of a shirred stick is limited by the length of the stuffing horn which is provided. Stuffing horns generally have a length of 40 to 100 cm. A shirred stick—depending on its length and the wall thickness of the casing—holds about 15 to 50 m of tube material. On the filling and clipping machine, at the start of work, a shirred stick is manually pushed onto the stuffing horn. Filling, sealing and separating the sausages then proceeds automatically. If a shirred stick is used up, the process must be interrupted in order to position a new shirred stick.

In contrast, combined tube sealing and stuffing processes succeed with significantly fewer interruptions. Instead of shirred sticks, here, flat film material is used, which film material is fed to the process via reels having a theoretically unlimited length. In practice, typically 500 to 1000 m are situated on a reel. The process can run continuously until a reel is used up. The process comprises the following steps:

continuous feeding of the film web in the direction of a stuffing horn;

axial rounding of the web, preferably using a shaping shoulder, so that the web end concentrically encloses the horn and the longitudinal edges of the web touch or somewhat overlap one another;

continuous sealing of the web edges to one another by a heating element which warms the material in the joining area and pressed onto the horn. If the web edges are conducted so as to overlap, an overlapping sealing seam forms. Alternatively, the edges can be laid to abut and are firmly joined to one another by a sealing strip which is fed separately from the exterior and bridges the abutment;

transporting the tube thus formed off the horn end where it is tightly stuffed by the exiting meat mix;

dividing off portions from the stuffed tube by means of a tie-off device, fixing and sealing the tied-off links by two metal and/or plastic clips positioned next to one another, finally separating the tube between the two clips, forming individual sausages.

The devices for this process type are known under various manufacturer-specific names, e.g. "TSCA" for equipment from Polyclip. Their structure is described in detail in various publications, e.g. in DE 14 11 489 and EP 0 105 558 (whose United States equivalent is U.S. Pat. No. 4,563,792).

Overall, therefore the tube sealing and stuffing technique gives two economic advantages over the use of seamless casings:
1. more rational production of the casing material by using a prefabricated wide web material and cutting blanks as required;
2. more efficient stuffing process, since processing interruptions are only required when a complete film reel is used up.

In order that the seal bond can occur, one or, better, both of the surfaces which are brought together must have thermally adhesive coatings. In the case of the overlap sealing, front and rear sides of the web material must be brought together. Here, this generally concerns surfaces of different materials; in the case of textile supports, usually the bare woven fabric or nonwoven structure is usually at the rear, whereas at the front a polymer surface coating of thermoplastic character is present. In the event of a sufficiently thick and plastic surface coating, during the warming and pressing, the coating begins to melt and partial penetration of the polymer into the pores of the opposite support occurs. After cooling, the surface layer is then mechanically anchored to the opposite side. In the case butt joining using a sealing strip, customarily the sealing strip contacts by its thermoplastic surface onto the likewise thermoplastic surface of the support material. On warming, the polymers of both surfaces begin to melt and adhere to one another. Ideally, interdiffusion of both layers occurs; this occurs, in particular, when the polymers are identical or chemically related.

However, the economic advantages of the tube sealing and stuffing process are counteracted in uncooked dry or semi-dry sausage manufacture by a technical defect. The seam join running longitudinally (hereinafter also termed the sealing seam) has in principle a significantly lower permeability than the adjacent material. This is because the permeability of a medium for water vapor, as also for (smoke) gases is subject to fixed laws. A given layer material has a substance-specific permeation coefficient P according to the following equation (source: S. Pauly in: Polymer Handbook, J. Brandrup, E. H. Immergut and E. A. Grulke (editors), 4th edition (1999), volume VI, page 543, John Wiley & Sons Inc.):

$$P = (\text{amount of permeant}) \times (\text{film thickness}) / ((\text{area}) \times (\text{time}) \times (\text{pressure drop across the film}))$$

On rearrangement this gives:

$$\text{permeation} = (\text{amount of permeant})/(\text{time}) = (P \times (\text{area}) \times (\text{pressure drop}))/(\text{film thickness})$$

The permeation is therefore inversely proportional to the thickness of the layer material.

Then in the case of sealing seams, regardless of whether constructed as an overlapping seam or butt seam with sealing strip, a substantial increase of the overall material thickness cannot be avoided in principle. In the case of an overlapping seam the material thickness is doubled (and the permeation halved). In a butt seam having a sealing strip the same applies if the thickness and composition of the strip are identical to that of the web material which is present. The effect may theoretically be reduced by a strip of lower thickness. However, in practice, this is scarcely possible, since the strip (in particular in the cross direction) must withstand the same mechanical tension as the remaining tube.

A consequence thereof is that the permeability to water vapor, as also to smoke components, under such sealing seams is only about half as great as in the adjoining casing material. In the case of an uncooked dry or semi-dry sausage filling, the sausage surface underneath the sealing seam would dry in a greatly retarded manner and an unacceptable light longitudinal stripe would form on the sausage.

SUMMARY OF ADVANTAGEOUS EMBODIMENTS OF THE INVENTION

The object was therefore to provide an uncooked dry or semi-dry sausage product, the production of which proceeds using the economic advantages of the tube sealing and stuffing process, but without the heretofore known stripe formation on the sausage surface below the sealing seam.

DETAILED DESCRIPTION OF ADVANTAGEOUS EMBODIMENTS OF THE INVENTION

The foregoing object was achieved by a flat textile material which, preferably at least on one side has a coating of a polymer material, and which is joined to form the tube by a sealing strip, wherein a discontinuous layer of a sealing polymer is situated on the sealing strip and the mechanical bond between strip and sheet material is at points, i.e. not over the whole surface.

The invention therefore relates to an uncooked dry or semi-dry sausage product in a tubular casing based on a textile material, wherein the casing has a longitudinal seam having a sealing strip, wherein a discontinuous layer of a sealing polymer is situated on the sealing strip. Preferably, the textile material is coated.

As a result, the water vapor permeation of the casing, measured at 23° C. and 85% RH within the area forming the sealing seam, is at least 70% of the value which the adjoining casing material has.

The sealing strip and the casing are essentially bonded at points. In this case the total area of the individual coating points should be sufficiently great that the sealing seam offers sufficient mechanical strength—in particular in the transverse direction—in order that the casing does not burst on stuffing, but on the other hand must be as small as possible in order not to impair unnecessarily the permeation in the region of the sealing seam. Also depending on the type of the sealing polymer it is generally sufficient when 10 to 60%, preferably 20 to 50%, of the area of the sealing strip is covered with sealing polymer. The points of the sealing polymer (after calendering) preferably have a median diameter of 0.005 to 5 mm, more preferably 0.01 to 1 mm, particularly preferably 0.05 to 0.5 mm. They should be as small as possible in order that uniform permeation is provided in the region of the sealing strip. During sealing, the diameter changes only insignificantly.

The flat textile material has the function of a support for the coating. It provides the essential contribution to the mechanical strength of the later casing.

Textile materials considered suitable for the present invention are in principle all types of textiles—that is woven fabrics, knitted fabrics and nonwovens—provided that they have an open or open-pore structure (that is are highly gas permeable) and which have accompanying essential mechanical properties which are required for an uncooked dry or semi-dry sausage casing. Preferably, the material should have a wet strength in the transverse direction of at least 30 N/50 mm. Suitable materials are, e.g., close-meshed fabrics of cotton or viscose fibers or mixed fibers of cotton and polyester, or viscose and polyester, nonwovens of staple fibers based on viscose, polyester or polypropylene or of mixtures of two or three of these fiber types, in addition spun bonded nonwovens (random nonwovens of endless fibers) of polyester, polyamide and/or polypropylene fibers. The nonwovens can be post-consolidated mechanically, chemically or thermally.

Preference is given to woven fabrics having a fine linen weave of viscose fibers or viscose-polyester mixed fibers in weights per unit area between 30 and 150 g/m$^2$ (before a potential coating). Likewise preference is given to staple fiber nonwovens produced in the wet laying process with chemical or thermal consolidation in weights per unit area between 25 and 100 g/m$^2$. Further preference is given to spun bonded nonwovens of polyester and/or polyamide fibers, partially post consolidated by hot embossing or over the surface by hot calendering in weights per unit area between 25 and 80 g/m$^2$.

Suitable coating materials are various film-forming polymers which have polar or hydrophilic groups, are swellable in water, but are not water soluble and as a consequence have a high permeability to water vapor and other polar substances. The material-specific (intrinsic) water uptake of the polymers, measured in accordance with ASTM E570 (test specimen stored for 24 h in water) should be at least 1.5% by weight.

In the interest of later sealability, the polymers should be partially or completely thermoplastic, that is have a softening temperature significantly below their decomposition temperature. The softening temperature should preferably be in the range between 80 and 200° C. They should in addition preferably be below the sealing temperature, in order to obtain a particularly strong sealing bond in which the polymers situated on the sealing strip are melted together with those of the coating. If the textile material is itself thermoplastic, the coating can if appropriate be omitted.

Preferred polymers are named hereinafter—separately according to their mode of application:

For coatings made of aqueous dispersion, emulsion polymers of esters of acrylic or methacrylic acid which optionally contain suitable comonomers such as (unesterified) acrylic or methacrylic acid, acrylonitrile, vinyl acetate and/or styrene, are highly suitable. The polymers should ideally be crosslinking thermally or on drying, that is have crosslinkable monomer building blocks and crosslinker substances. Particular preference is given to copolymers of methyl acrylate, butyl acrylate and acrylic acid having a solids content of 25 to 40% by weight.

For coatings by melt extrusion, thermoplastic segment polymers or copolymers of the polyether-ester, polyether-block amide, polyester-block amide, polyether-urethane and polyester-urethane type can be used, likewise copolymers or terpolymers of acrylic acid or methacrylic acid with ethylene or ethylene and one or more further vinyl monomers, wherein the fraction of (meth)acrylic acid should be at least 15% by weight. In addition, ethylene-vinyl alcohol copolymers having an ethylene content of at most 42% by weight are suitable. Particular preference is given to polyetheresters and polyether amides which contain hydrophilic segments of the polyethylene glycol or polypropylene glycol type and which have a melt flow index (MFI) of at least 10 g/10 min (measured at 240° C. under a load of 2.16 kg).

The sealing strip is likewise produced from a flat textile material, by cutting this longitudinally into narrow strips (width preferably 10 to 30 mm). In principle the same textile support materials come into consideration as described above. Preference is given to fine woven fabrics of viscose and/or polyester fibers and also spun bonded nonwovens of polyester and/or polyamide fibers, the latter having slight chemical reconsolidation.

Discontinuous application of the sealing polymer to the support material preferably proceeds before cutting the strip and by powder coating. The principle of powder coating is prior art in textile finishing and is familiar to those skilled in the art. A customary process contains:

1. warming the textile web to a temperature slightly above the softening temperature of the sealing polymer which is to be applied,
2. uniform scattering of the sealing polymer which is ground to a powder (corresponding devices are known, e.g. the scattering can be supported by an electrostatic field),
3. pressing and fixing the polymer particles by calendering the textile web. Preferably, the calender rolls are likewise heated in this case.

It is important that the polymer particles subsequently do not give a closed film, but form individual "points" on the textile surface, the area coverage of which makes up 10 to 60%, preferably 20 to 50%. This may be achieved by suitable setting of the amount scattered and the compression force of the calender.

By means of the polymer particles lying isolated on the sealing strip, in the later tube sealing and stuffing process, point-form mechanical bonds between strip and web material occur which give sufficient overall strength of the sealing surface in the case of sufficiently narrow distance between the points. In the space between two sealing points, the water vapor permeability is virtually identical to that of the unsealed web material. There is in fact an additional permeation resistance in the intermediate spaces due to the textile support of the web lying thereupon, and it is extremely low because of its porosity.

The sealing polymer for the strip must be matched to the coating polymer of the web material in the interest of good adhesion values. The sealing polymer on the sealing strip can be identical to the textile material polymer coating, or some of the monomer units in the sealing polymer can be identical to monomer units in the polymer coating. Suitable materials are, in particular, combinations of materially related polymers, e.g.:

| Polymers for web material | Polymers for sealing strip |
|---|---|
| Polymers containing esters of acrylic or methacrylic acid (for dispersion coating) | Ethylene/methyl acrylate copolymers Ethylene/(meth)acrylic acid copolymers |
| Polyether esters (for melt coating) | Ethylene/vinyl acetate copolymers amorphous copolyesters ("APET") |
| Polyester-block amides and polyether-block amides (for melt coating) | aliphatic copolyamides having melting temperatures <180° C. |
| Polyester-urethanes and polyether urethanes (for melt coating) | Polyurethane hot-melt adhesives |

Preference is given to the following combinations:

| POLYMERS FOR WEB MATERIAL | POLYMERS FOR SEALING STRIP |
|---|---|
| Polymers containing esters of acrylic or methacrylic acid (for dispersion coating) | Ethylene/methyl acrylate copolymers |
| Polyether esters (for melt coating) | Ethylene/vinyl acetate copolymers |
| Polyether-block amides (for melt coating) | Nylon 6/12 having a melting temperature in the range 130 to 170° C. |

The present invention accordingly also relates to a process for producing the uncooked dry or semi-dry sausage product. The process comprises the steps:
providing a web-form, optionally coated, textile material;
providing a sealing strip having a discontinuous sealing layer;
forming the web-form, optionally coated, textile material to form a tube on a stuffing horn of a sausage stuffing machine, wherein the longitudinal edges of the textile material contact or overlap after the tube forming;
passing the sealing strip over the region in which the longitudinal edges of the textile material contact or overlap one another;
sealing the strip against the, optional coated, textile material under the action of heat and pressure in such a manner that a mechanically stable uncoated dry or semi-dry sausage casing is formed;
stuffing the casing with uncooked dry or semi-dry sausage emulsion directly after sealing, so that an uncooked dry or semi-dry sausage product is formed;
optionally cold smoking the uncooked dry or semi-dry sausage product and
ripening the uncooked dry or semi-dry sausage product.

EXAMPLES

For the examples, use was made of the following materials, polymers, apparatuses and methods:

Textile Material:
A commercially available viscose-polyester mixed fabric (30% polyester fraction) in linen weave having a weight per unit area of 60 g/m² and a transverse wet strength of 105 N/50 mm.

Polymer 1:
Polyether-block amide having chain units based on polyethylene glycol and based on polycaprolactam and a melting temperature of 169° C. (PEBAX® MV 1074 SA from Arkema S.A.).

Polymer 2:
Aliphatic copolyamide based on caprolactam and laurolactam in the ratio 50:50 (Nylon 6/12) and having a melting temperature of 130° C. (GRILON® CF6S from Ems-Chemie AG); grind this to powder of a median grain size $d_{50}$ of approximately. 300 μm.

Melt Coating Apparatus:
Laboratory coating apparatus from Collin having a heated casting roll of 500 mm width, contact roll and also press roll pair; melt feed by 25 mm screw extruder having a 400 mm wide slot die.

Powder Coating Apparatus:
Commercially available textile calender for 100 mm web width having heatable rollers and additional unit for powder coating (electrically operated shaking sieve).

Hot Press:
Laboratory apparatus from Schwabenthan, electrically heated, having pressing surfaces 150×150 mm and hydraulically settable compression pressure.

Tube Sealing and Stuffing Device:
Model "TSCA" from Polyclip GmbH, coupled to commercially available automatic metering device for sausage mix from Handtmann.

Determination of Water Vapor Permeation:
The water vapor permeation was measured as specified by DIN 53122, part 3, at 23° C. and a moisture gradient of 85% against 0% RH.

Because of its small width, a sealed seam does not offer the possibility of cutting sample pieces corresponding to the customary standards for water vapor permeation. Nevertheless, standardized results can be achieved by using samples having a smaller diameter, measuring these as prescribed and subsequently multiplying the measured values by the factor by which the standard area is greater than the actual sample area. In order to clamp the samples into the measuring cells, e.g. a "mask" of aluminum sheet can be used, the outer diameter of which fits the measuring cell. A hole of defined area is cut centrally into the mask, which hole is somewhat smaller than the same size. The sample is placed on the hole and glued airtightly to the mask at the rim.

Example 1

Production of Coated Web Material

The textile material was cut into blanks of 400 mm width. These were coated on one side with a film of polymer 1 using a melt coating apparatus. For this the polymer granules were melted and plasticized in the extruder at temperatures rising from 120 to 240° C., pressed through the die heated to 240° C. and placed onto the casting roll which was heated to 80° C. Directly behind the melt film, the textile web was placed onto the roll and pressed on by the contact roller. The composite formed was subsequently compressed by a downstream roller pair having a pressure of 50 bar, then cooled, hemmed at the edges and wound up. The application rate of polymer was 40 g/m². The material was subsequently cut up into part blanks of 157 mm width. The water vapor permeation was measured on 5 sample pieces. This gave a median value of 520 g/m²·d.

Example 2

Production of Sealing Strip

Textile material was cut into blanks of 1000 mm width. A blank was conducted through the textile calender and heated over heated press rolls to a temperature of 140° C. Onto the warm horizontally running web, grains of polymer 2 were uniformly applied by shaking sieve. Subsequently the web passed through further press roll pairs of which the first was heated to and maintained at 120° C., the remainder, at room temperature. The finished web material was hemmed and cut into sealed strips of 15 mm width. A remnant was kept uncut. Exact measurement of the water vapor permeation was not possible, since the permeability of the material was too high for the measuring method.

Example 3

Test Sealing

Sample pieces of 100×100 mm were cut from the web material of example 1 and undivided material remnant from example 2. One sample piece each of the first material and one of the second material were laid one on top of the other with the coating sides facing one another and were sealed by the heating press at a temperature of 200° C. and a pressure of 6 bar for 5 s. After cooling, a firm bond was present which could be separated by hand only with great use of force. The water vapor permeation measured at 5 sealed samples was a mean 460 g/m²·d.

Example 4

Tube Sealing and Stuffing Experiment with Subsequent Sausage Ripening

A wound up partial blank of example 1 and also wound up sealing strip from example 2 were placed into the "TSCA" tube sealing and stuffing machine. The web was conducted in such a manner that the longitudinal edges were laid to abut and the sealing strip was conducted centrally over the abutting joint. The metering machine was charged with coarse-grained cooled salami emulsion. The sealing element of the TSCA was set to a temperature of 230° C. and the maximum possible pressing force. Under these conditions, a tube of a caliber of 50 mm was sealed and this was continuously stuffed with salami emulsion. From the continuously formed charge, sausages having a weight each of 400 g were automatically separated off, which sausages were clipped at the ends and separated from one another downstream of the clips.

The sausages were suspended, brought into a smoking and ripening chamber, and under conventional conditions reddened and cold-smoked there. Subsequently, ripening proceeded for four weeks according to a common climatic program for salami; at the end the temperature was 18° C. and the relative humidity of the air 45%. The median loss in weight of the sausages after ripening was 36%. The sausages were peeled and the sausage surface was rated for color and consistency. All sausages exhibited a uniformly dark-brown color and a uniformly solid feel. A stripe could neither be seen nor felt.

Comparative Example 1

Production of Sealing Strip

A remnant of the web material which was coated on the whole surface from example 1 was likewise cut into sealing strips of 15 mm width.

Comparative Example 2

Test Sealing

From the web material of example 1, again sample pieces of 100×100 mm were cut. 2 of these sample pieces in each case were laid one over the other with the coating sides facing and pressed hot, as described in example 2. Again the water vapor permeation was measured on 5 of these sample pieces; this was a mean of only 250 g/m²·d.

Comparative Example 3

Tube Sealing and Stuffing Experiment with Subsequent Sausage Ripening

Under the same conditions as in example 4, salami sausages were produced, but sealing strip from example 2 was used. Rating the completely ripened and peeled sausages showed light, markedly contrasting longitudinal stripes at the positions where the sealing strip had previously been placed. In the region of the stripes, in addition, a significantly softer constituency of the surface could be perceived by touch than on the remaining surface.

That which is claimed is:

1. An uncooked, dry or semi-dry sausage product comprising a tubular casing comprising a web of textile material, said casing comprising a longitudinal seam having a sealing strip, wherein a discontinuous layer of sealing points comprising a sealing polymer is situated on the sealing strip, said web of textile material is coated directly with a thermoplastic polymeric coating, and said sealing polymer is melted together with said thermoplastic polymeric coating to bond said sealing strip to said web of textile material coated with said thermoplastic polymeric coating,
the thermoplastic polymeric coating has softening temperature in the range from 80 to 200° C.,
wherein said coating is a polyether-ester or polyether-block amide; and
if said coating is the polyether-ester, then the sealing polymer is an ethylene vinyl acetate copolymer, and
if said coating is the polyether-block amide, then the sealing polymer is an aliphatic copolyamide.

2. The uncooked, dry Or semi-dry sausage product as claimed in claim 1, wherein the water vapor permeation of the casing, measured at 23° C. and 85% RH, within the area forming the sealing seam is at least 70% of the water vapor permeation value of the casing outside the area forming the sealing seam.

3. The uncooked, dry or semi-dry sausage product as claimed in claim 1, wherein 10 to 60% of the area of the sealing strip is covered with sealing polymer.

4. The uncooked, dry or semi-dry sausage product as claimed in claim 3, wherein the sealing points have a median diameter of 0.005 to 5 mm.

5. The uncooked, dry or semi-dry sausage product as claimed in claim wherein the web of textile material is a woven fabric, knitted fabric or nonwoven.

6. The uncooked, dry or semi-dry sausage product as claimed in claim 1, wherein the web of textile material comprises cotton fibers, viscose fibers, polyester fibers, polyamide fibers, polypropylene fibers, mixed fibers of cotton and polyester, mixed fibers of viscose and polyester, staple fibers based on viscose, polyester or polypropylene, or mixtures thereof.

7. The uncooked, dry or semi-dry sausage product as claimed in claim 1, wherein the web of textile material, before being coated, has a wet strength in the transverse direction of at least 30 N/50 mm.

8. The uncooked, dry or semi-dry sausage product as claimed in claim 1, wherein the thermoplastic polymeric coating comprises at least one thermoplastic film-forming polymer that has polar or hydrophilic groups, is swellable in water, but is not water-soluble, and exhibits an intrinsic water uptake, measured in accordance with ASTM E570, test specimen stored in water for 24 hours, of at least 0.5% by weight.

9. The uncooked, dry or semi-dry sausage product as claimed in claim 1, wherein the coating is only on the side facing away from the uncooked dry or semidry sausage.

10. The uncooked, dry or semi-dry sausage product as claimed in claim 1, wherein the sealing strip comprises a textile material.

11. The uncooked, dry or semi-dry sausage product as claimed in claim 1, wherein the sealing strip has a width of 10 to 30 mm.

12. The uncooked, dry or semi-dry sausage product as claimed in claim 1, wherein the thermoplastic polymeric coating consists of the polyether-block amide and the sealing strip is coated with the aliphatic copolyamide, the aliphatic copolyamide having a softening point of below 180° C.

13. The uncooked, dry or semi-dry sausage product as claimed in claim 3, wherein 20 to 50% of the area of the sealing strip is covered with the sealing polymer.

14. The uncooked, dry or semi-dry sausage product as claimed in claim 4, wherein the sealing points of the sealing polymer have a median diameter of 0.01 to mm.

15. The uncooked, dry or semi-dry sausage product as claimed in claim 4, wherein the sealing points of the sealing polymer have, a median diameter of 0.05 to 0.5 mm.

16. The uncooked, dry or semi-dry sausage product as claimed in claim 5, wherein the web of textile material, prior to coating with the thermoplastic polymeric coating, has a weight of 30 to 150 g/m.

17. The uncooked, dry or semi-dry sausage product as claimed in claim 10, wherein the sealing strip comprises a textile material that is identical to the textile material of the tubular casing.

18. The uncooked, dry or semi-dry sausage product as claimed in claim 1, wherein said tubular casing consists of the web of textile material coated with the thermoplastic polymeric coating and the sealing strip having a discontinuous layer of sealing points formed from the sealing polymer, said thermoplastic polymer within said coating having a softening temperature ranging between 80 and 200° C.

19. The uncooked dry or semi dry sausage product as claimed in claim 1, wherein said thermoplastic polymeric coating has a melt flow index of at least 10 g/10 min (measured at 240° C. under a load of 2.16 kg).

20. An uncooked, dry or semi-dry sausage product comprising a tubular casing comprising a web of textile material that has an uncoated weight 30 to 150 g/m2, said web of textile material comprising a direct coating, said direct coating comprising at least one thermoplastic film-forming polymer that has polar or hydrophilic groups, is swellable in water, is not water-soluble and exhibits an intrinsic water uptake, measured in accordance with ASTM E570, test specimen stored in water for 24 hours, of at least 1.5% by weight,
    said tubular casing comprising a longitudinal seam having a sealing strip wherein a discontinuous layer of sealing points comprising a sealing polymer is positioned on the sealing strip,
    the direct coating has a softening temperature in the range from 80 to 200 C,
    wherein said direct coating a polyether-ester or polyether-block amide, the polyether-ester or polyether-block amide having a melt flow index of at least 10 g/10 min, measured at 240° C. under a load of 2.16 kg;
    if said direct coating is the polyether-ester, then the sealing polymer is an ethylene vinyl acetate copolymer and
    if said direct coating is the polyether-block amide then the sealing polymer is an aliphatic copolyamide.

21. The uncooked, dry or semi-dry sausage product as claimed in claim 20, wherein the direct coating consists of the polyester-block amide,
    the sealing polymer on the sealing strip consists of an aliphatic copolyamide having a melting temperature of less than 180° C. and
    after smoking and ripening the uncooked, dry or semi-dry sausage product, a stripe is not seen nor felt.

22. A process for producing the uncooked, dry or semi-dry sausage product as claimed in claim 1 comprising:
    providing a web of textile material, the web of textile material is coated with the thermoplastic polymeric coating as recited in claim 1;
    providing a sealing strip having a discontinuous sealing layer of sealing points comprising the sealing polymer on the sealing strip as recited in claim 1;
    forming the coated web of textile material into a tube on a stuffing horn of a sausage stuffing machine, wherein longitudinal edges of the textile material contact or overlap after the tube forming;
    passing the coated sealing strip over the region in which the longitudinal edges of the textile material contact or overlap one another;
    sealing the strip to the coated web of textile material using heat and pressure to form a mechanically stable dry or semi-dry sausage casing;
    stuffing the casing with uncooked dry or semi-dry sausage emulsion directly after sealing to form an uncooked, dry or semi-dry sausage product, a recited in claim 1;
    optionally cold smoking the uncooked dry or semi-dry sausage product, and
    ripening the uncooked dry or semi-dry sausage product.

23. The process as claimed in claim 22, wherein the coated web of textile material and the sealing strip are each provided in the form of a reel having a length of 500 to 1000 m.

24. The process as claimed in claim 22, wherein said step of providing the sealing strip further comprises applying sealing polymer to the sealing strip in the form of powder and subsequently calendaring the sealing strip.

* * * * *